United States Patent [19]
Covington

[11] 3,956,768
[45] May 11, 1976

[54] VIDEOTAPE CASSETTE AUTOMATIC LOADER-UNLOADER

[76] Inventor: Edward L. Covington, 510 N. Sheridan, Tulsa, Okla. 74115

[22] Filed: Oct. 29, 1974

[21] Appl. No.: 518,411

[52] U.S. Cl. ............................... 360/92; 360/85
[51] Int. Cl.² ................... G11B 15/68; G11B 23/04
[58] Field of Search ................. 360/92, 85, 83–84, 360/90–91, 132; 242/191–200

[56] References Cited
UNITED STATES PATENTS

| | | |
|---|---|---|
| 3,765,684 | 10/1973 | Sato ........................................ 360/92 |
| 3,774,916 | 11/1973 | Nanba .................................... 360/92 |

*Primary Examiner*—Alfred H. Eddleman
*Attorney, Agent, or Firm*—Head, Johnson & Chafin

[57] ABSTRACT

An automatic loader-unloader of cassettes to and from a videotape deck in which the unloader comprises means to tilt and support the videotape with its top surface at a selected angle to the horizontal, and providing a shelf in front of the deck with the shelf coplanar with the top surface of the deck. Loading means are provided by means of an arm mounted above and parallel to the deck surface with means adapted to press against the back edge and top surface of the cassette when mounted on the shelf, so as to provide two components of force, one parallel to the plane of the cassette, causing it to move off the shelf and on to the elevator plate of the tape deck, and a second force perpendicular to the surface of the cassette so that when the deck is positioned on the elevator, and extends the eject spring, the downward force will cause the elevator to move downwardly and into the recording position. To unload the deck there are means to operate the eject lever on the tape deck, which lifts the elevator to move to its upper position, and the eject plate exerts a force on the cassette to move it forwardly, off the elevator plate from which it falls, by gravity, along the surface of the elevator and of the shelf, to be positioned on the shelf.

15 Claims, 3 Drawing Figures

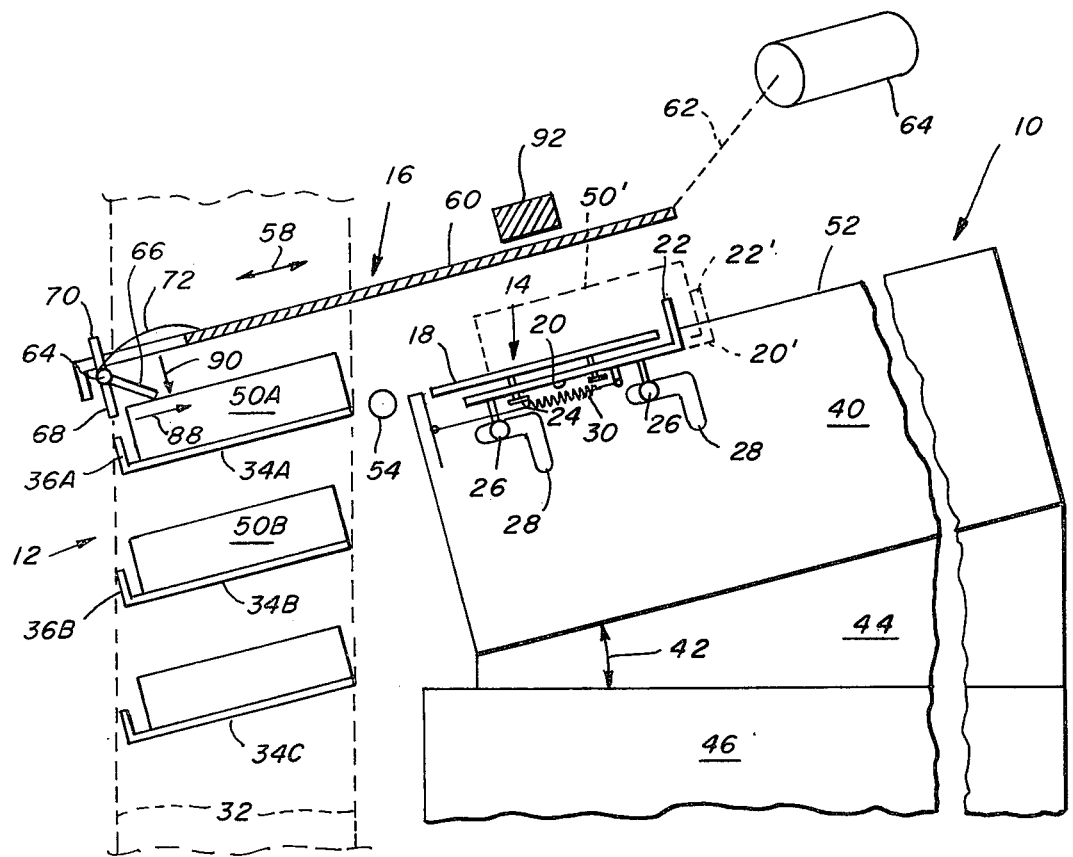
FIG. 1
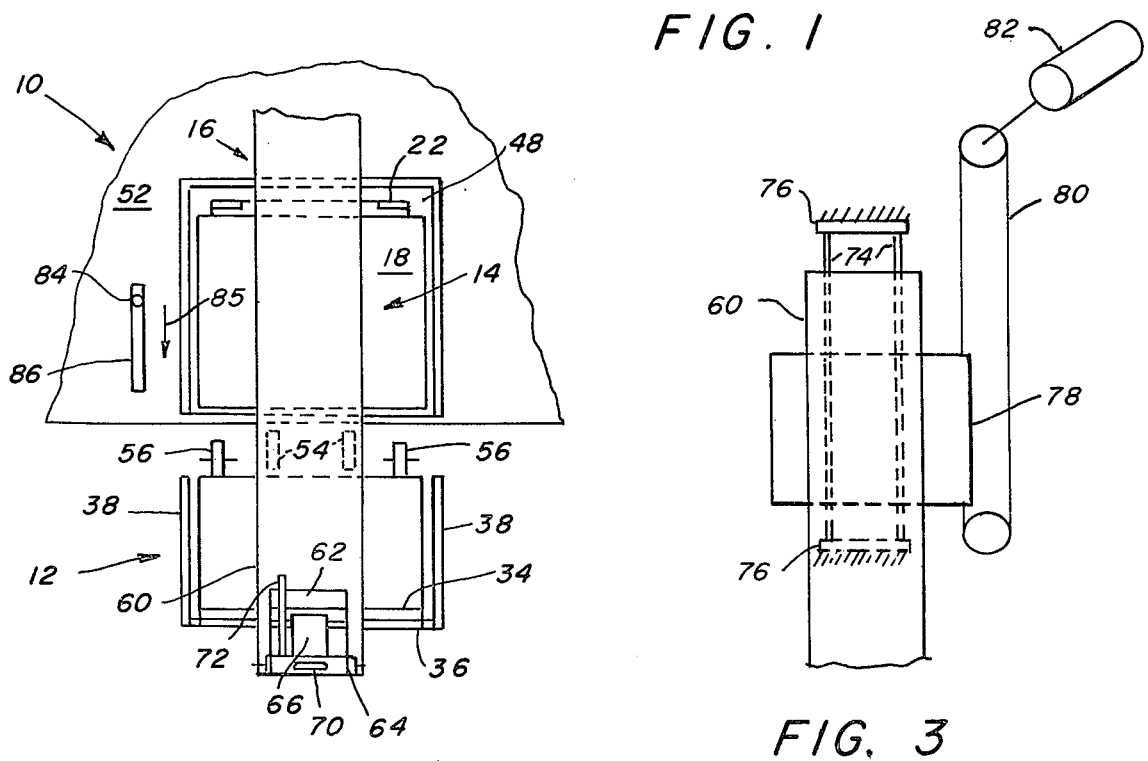
FIG. 2
FIG. 3

VIDEOTAPE CASSETTE AUTOMATIC LOADER-UNLOADER

BACKGROUND OF THE INVENTION

This invention is in the field of videotape apparatus. More particularly, it is concerned with videotape decks which operate with tape cassettes. Still more particularly, it concerns a type of videotape deck in which the cassette can be placed on an elevator plate and by being pushed forwardly and downwardly, the elevator plate will move downwardly and latch in its lower, operating position. By operating an eject lever, the elevator plate is lifted from its lower operating position to its upper loading-unloading position. When the elevator plate is in its upper position, the eject plate which is extended from its normal position against a spring pull, is free to move to its normal position, and exert the spring force on the cassette, forcing it off the elevator plate.

In the TV broadcast industry and in cable television, there are systems which are used for broadcasting information and programs which are recorded on videotape cassettes. In normal operations these cassettes, are loaded manually into a videotape deck at the proper time, to suit the programming of the station.

Some effort has been made in the past to automatize broadcasting from videotape cassettes, by using a plurality of videotape decks and manually loading them at one time, and then by automatic scheduling and relay operation, connecting the various decks sequentially to the broadcast apparatus so as to maintain a long duration program of broadcast. Since the time duration of playing of a tape cassette is generally of the order of one hour, to provide a long time duration programming requires a large number of tape decks, which is expensive and inefficient. This invention is directed to the problem of minimizing the expense and apparatus involved in providing a long time duration program, pre-recorded and preorganized on a plurality of cassettes, with means to automatically sequentially load and unload each of the cassettes into a single videotape deck.

SUMMARY OF THE INVENTION

It is a primary object of this invention to provide an automatic means for loading and unloading videotape cassettes, into a videotape deck, so that a long time programming may be provided with a single tape deck.

These and other objects are realized and the limitations of the prior art are overcome in this invention by providing means for storing cassettes on a mounting means in movable relationship to a videotape deck, and providing means for sequentially loading the cassettes from the mounting means onto the tapedeck, and unloading cassettes from the tape deck onto the mounting means.

In this invention the unloading means involves the use of the cassette ejection means provided in the tape deck. This includes means for supporting a cassette on an elevator plate which is depressed into the tape deck and locked into position, from which the tape is drawn out to a capstan and head system. To eject a cassette from the deck a lever is provided which raises the elevator to a position parallel to the surface of the deck, and spring means provides a spring force exerted against the cassette causing it to be moved off the elevator plate onto a shelf, which is provided coplanar with the elevator plate.

The videotape deck is mounted at a selected tilt angle with the horizontal, and the shelf which is to receive and hold the cassette is coplanar with the elevator surface. Thus when the tape cassette is ejected from the elevator is slides by gravity onto the shelf and remains in that position until it is again required to be loaded into the deck. A plurality of shelves can be provided each parallel to the other in a vertical frame work, which can be raised and lowered mechanically. Any one of the shelves can be placed in operating position with respect to the tape deck, so that any selected cassette on any selected shelf can be loaded onto the elvator table and positioned in the machine.

The loading means by which the tape deck is moved off the shelf onto the elvator plate comprises an arm mounted over and parallel to the top of the tape deck and shelf. The arm is reciprocable along an axis substantially perpendicular to the front edge of the deck. This arm has a means to press against the back edge of the tape deck and the top surface of the tape deck, so that there will be a force in the plane of the cassette and downwardly on the cassette, so that as the cassette is moved onto the elevator plate it will continue to move until it extends the eject spring means. At the same time the ejecte means is moved backwardly in slots, and then into vertical slots, so that the downward pressure on the tape deck causes the elevator to move downwardly into operating position.

The loading arm is mounted above the tape deck and is normally positioned in a retrieved position over the tape deck. When a cassette is to be loaded the cassette is placed on the shelf in front of the deck. The load arm moves forward until it extends beyond the back edge of the cassette. A pair of fingers press against the back edge and top of the cassette. The arm then moves forward to its position over the tape deck, carrying the cassette with it, until the cassette is positioned on the elevator plate and the eject means is permitted to drop the elevator table into operating position.

BRIEF DESCRIPTION OF THE DRAWINGS

These and other objects and advantages of this invention and a better understanding of the principles and details of the invention will be evident in the following description taken in conjunction with the appended drawings in which:

FIG. 1 represents a side view partly in section of the tape deck, deck support means, shelf and the loading arm.

FIG. 2 represents a plan view of the tape deck, loading shelf and loading arm.

FIG. 3 illustrates one possible mechanism for reciprocating the loading arm.

DESCRIPTION OF THE PREFERRED EMBODIMENT

Referring now to the drawings and particularly to FIGS. 1 and 2, there is illustrated generally by the numeral 10 a videotape deck of the type known as the U-MATIC. This is a trademark of the Sony Corporation which manufactures the tape deck which is in wide use in the broadcast and cable TV industries. The tape deck itself forms no part of this invention. This specific type of videotape deck has a means for rapidly loading and unloading or ejecting, cassettes into and from the tape deck, by manual means. This type of deck is convenient for use in an automatic cassette loading and unloading system.

Numeral 12 indicates generally a moving rack system carrying a plurality of shelves 34, on each of which can be placed a cassette 50 for sequential loading into the tape deck 10. Since the unloading feature of the automatic system of this invention involves gravity forces, the tape deck system 10 is tilted and supported at a selected acute angle 42, on top of a support table 46. The loading arm is indicated generally by the numeral 16, and the loading platform system of the deck 10 is indicated generally by the numeral 14.

The videotape deck, or tape deck, or deck, is indicated by the numeral 40 and is mounted on an angle support means 44 on a support table 46. The angle of tilt 42 is any selected value but can conveniently be in the range of 10° to 20° and preferably about 15 degrees. The top surface of the deck 52 has an opening 48 in which is positioned a loading platform or elevator plate 18, operated in conjunction with a sliding ejection plate 20, which has a pair of upstanding angles, 22. There is a shelf 34A which carries an upstanding end 36A on which the cassette 50A is positioned for loading. The plane of the shelf 34A is in the plane of the elevator plate 18, so that any means which can exert a force, in the plane of the cassette, to the right, will force the cassette up the slope of the shelf, and onto the elevator plate 18. As it is pushed further to the right, it strikes the angles 22 which are attached to the ejection plate 20 causing the plate to move to the right to the dashed position 22'.

There are two sets of rollers 26 attached to the ejection plate 20, which operates in guide slots 28 so that the ejection plate can move backwardly under the force of the loading of the cassette to the position 22', whereby the rollers 26 then fall into a vertical portion of the slots 28, making it possible for the ejection plate 22 which is in operating relation to the elevator plate 18 to drop permitting the cassette to drop down into the box of the videotape deck 40. The tape cassette is then in operating relation to the tape deck.

There is on the surface 52 of the deck 40, as shown in FIG. 2, a slot 86 in which a lever 84 is provided. This is an eject lever which by moving in the direction of the arrow 85 will mechanically lift the elevator plate so that the rollers 26 in the slots 28 finally come to the position where they can move to the left. The force of the extended spring 30 causes the ejection plate 22 to move to the left, exerting a force on the cassette, to force it off the elevator plate 18 of the tape deck, and onto the shelf 34A. This is assisted by means of a pair of rollers 54 which are slightly higher than the plane of the elevator plate and the shelves, so that there is less friction to movement of the cassette from the elevator plate to the shelf position.

The unloading operation combines the ejection force provided by the spring 30 and the tilted surface feature of the tape deck, which permits gravity to carry the cassette from the surface of the elevator plate to the surface of the shelf. Therefore, the angle at which the deck is supported is important to the unload feature.

So far as loading is concerned, the commercial tape decks are made for manual loading of the cassette. To do this, the cassette is positioned on the elevator plate 18 and pushed against the angles 22 of the eject plate 20, stressing the spring 30, and simultaneously moving the rollers 26 to the position where they can fall in the slots 28 whereby a downward force on the cassette surface causes the elevator plate to move to the downward position where the tape is in operating relationship to the deck mechanism. By operating the reject lever 84 the elevator plate 18 is raised to the surface, and the eject plate 20 is permitted to move to the left, exerting a suitable force on the cassette to move it off the elevator plate on to the shelf.

It has been found therefore, that two forces are required, or two components of a single force, whereby there is one force 88 in the plane of the cassette causing it to move to the right and onto the elevator plate, and there is a force 90 which forces the cassette downward so that once it is on the elevator plate it will cause the elevator to move downwardly, placing the cassette in operating relation in the deck.

These two forces 88 and 90 are provided by a single mechanism, namely a pair of fingers 66 and 68 which are mounted on a rotatable member 64 attached to the arm 60. As will be explained in connection with FIG. 3 the arm 60 is adapted to move into and out of a position over the tape deck in accordance with the arrow 58. Moving into the position over the deck indicates movement to the right. Moving out of the position over the deck indicates movement of the left. This movement is shown schematically by the dashed line 62 indicated a control and operating mechanism and a motor means 64.

As shown in the plan view of the arm 60, in FIG. 2, there is a cut out portion 62 in which the fingers 66 and 68 can operate. These are attached to the rotatable member 64 so that as the arm 60 moves to the right the two fingers 66 and 68 engage respectively the top and back edge surfaces of the cassette 50A. As the arm moves to the right these fingers carry the cassette to the right. A spring arm 72 is provided to maintain the two fingers in a proper relation to the back edge and top surface of the cassette 50A. The hinged feature of the rod 64 permits the two fingers to adjust to the surfaces of the cassette so that the position of the cassette and the arm is not critical.

The two fingers 66 and 68 which contact the surfaces of the cassette provides two forces, the inline force 88 and the cross force 90. As the arm moves to the right the cassette 50A moves to the position shown in dashed line 50', and extends the eject plate 20 to the dashed position 20', where the operating angles 22 are then in the position 22'. The downward force exerted by the fingers 66 then presses downwardly on the cassette 50' causing the elevator plate 18 to move down, and place the cassette into operating position.

The rotating member 64 has a third finger 70 which extends upwardly. In the loading operation as the arm moves to the right, just after the elevator plate 18 drops and lowers the cassette, the finger 70 strikes a stationary stop 92, which causes the rotating member to rotate counterclockwise and lift the fingers 66, 68 up into the space 62, where they are above the top of the cassette 50'. Thus when the cassette is raised to the position 50' in the unloading operation, there is no contact with the fingers 66, 68.

In FIG. 3 is shown in schematic fashion one possible mechanism for reciprocating the loading arm 60. This comprises two fixed supports 76 carrying two parallel guide rods 74. A table 78 is supported on means which slide on the guide rods 74 in a forward and backward direction. The table 78 carries the loading arm 60 and is moved along the rods 74 by means of a cable of chain 80 driven by suitable motor means 82. It is well known in the art that by the use of limit switches and reversing connections the motor 82 can be used to drive the arm in one direction to a limit switch where it is stopped, and then on closing a second circuit the table will move in the opposite direction until it hits the limit switch and stops and so on. Since this particular feature of the drive mechanism is not critical to the invention, nor further description will be made, since such mechanisms are well known in the art.

So far, the loading and unloading apparatus and operations of the cassette into and out of the tape deck 40 have been described. The particular advantage of this automatic loading and unloading lies in the fact that a plurality of cassettes, such as 50A and 50B etc., can be positioned on a plurality of shelves 34A, 34B and so on. The shelves can be attached to a vertical framework 32 shown in dashed line, which is adapted by means of guides and rollers, as is well known in the art, to move vertically, and be driven by appropriate motor means, etc. Thus, by such motor means and control switching, which is well known the frame work 32 can be raised and lowered so that any one of the shelves 34A, 34B etc., can be positioned in the loading position, from which its cassette can be moved onto the tape deck by the arm 60, etc. Therefore, by appropriate control and logic means, which are well known in the art, the plurality of cassettes can be placed in a pre-selected sequence onto the plurality of shelves and the operating mechanism will then successively load these cassettes into the deck, play them, unload them onto the shelves, and by selecting a new shelf and a new cassette, continue the operating program.

There are two important features of this invention. One is that the unloading of the tape cassette is aided by gravity and this requires the tilting of the deck to a selected angle, so that the tape cassette will fall onto the shelf. The second feature is that in the loading operation, the loading arm provdes two components of force on the cassette, one, force 88, in the plane of the cassette, causing it to be moved onto the elevator plate, and two, a force 80 perpendicular to the cassette causing it to press down on the elevator and cause it to move down into the deck.

While the invention has been described with a certain degree of particularity, it is manifest that many changes may be made in the details of construction, and the arrangement of components. It is understood that the invention is not to be limited to the specific embodiment set forth herein by way of exemplifying the invention but the invention is to be limited only by the scope of the attached claim or claims.

While I speak of shelf means for supporting said cassette in loading position in front of said tape deck, any desired type of support surface can, of course, be used, such as a plurality of shelves in a vertical array, a horizontal belt means, a rotating disc means, and so on.

What is claimed is:

1. A videotape cassette automatic loader-unloader system adapted to load cassettes into a videotape deck, from a shelf means and to unload said cassettes from said deck to said shelf means, said videotape deck having an elevator plate means onto which a cassette is placed and means to depress said elevator plate a selected distance to cause the tape in said cassette to be played, the improvement in means to load a cassette from said shelf means to said deck and unload said cassette from said deck to said shelf means comprising:
    a. means to support said deck at a selected small tilt angle to the horizontal said tilt being upward from the edge of said deck adjacent said shelf means;
    b. vertically positionable shelf means in front of said elevator plate means of said videotape deck, the top surface of said shelf means substantially coplanar with the top surface of said elevator plate means, a cassette in loading position on said shelf means;
    c. loading means including means moving substantially parallel to said tilted deck to exert a force on said cassette at its back edge, said force having a first component parallel to the plane of said cassette, adapted to force said cassette in a forward direction along the surface of said shelf means onto the top surface of said elevator plate, and a second component substantially perpendicular to the plane of said cassette adapted to force said cassette downward;
       whereby said loading means will slide said cassette across said shelf onto said elevator plate, and moving farther, will extend an ejection means permitting the elevator plate to drop and position the cassette in the deck; and
    d. means to lift said elevator plate means and means to eject said cassette along the surface of said elevator plate means, whereby said cassette will be ejected horizontally from said elevator plate means, and will slide to said shelf means by gravity.

2. The loader-unloader system as in claim 1 including roller means between the front edge of said elevator plate means and the front edge of said shelf means, the top of said roller means higher than the plane of said elevator plate means in its load-unload position.

3. The loader-unloader system as in claim 1 including back-position-limiting means on the back of said shelf means.

4. The loader-unloader system as in claim 1 in which said loading means includes means to remove said force components once said elevator plate means starts to drop.

5. The loader-unloader system as in claim 1 in which said loading means comprises mechanical means.

6. The loader-unloader system as in claim 5 in which said loading means comprises;
    a. arm means adapted to move in a plane above and substantially parallel to the top of said cassette while on said shelf, in a direction substantially perpendicular to the back edge of said cassette on said shelf; and
    b. hinged, force-applying means on the end of said arm adapted to contact said back edge and top of said cassette, and carry said cassette forward onto said elevator.

7. The loader-unloader system as in claim 6 in which said force applying means comprises first and second force applying fingers attached to rod means rotatable on said arm, said fingers attached to said rod means at a selected acute angle and including spring means for holding said fingers in selected directions.

8. The loader-unloader system as in claim 7 including a third finger means attached to said rod means, and stop means fixed relative to said moving arm means; whereby at the extreme inner position of said arm, said first and second fingers are raised so as to clear the top of said cassette while on said elevator.

9. The loader-unloader system as in claim 1 in which said shelf means comprises one of a plurality of shelves arranged at the same tilt angle, placed one above the other, each capable of supporting a cassette in position to load, said plurality of shelves in a vertical frame, and means to move said frame in a vertical plane, whereby said shelves are sequentially in operating relation to said videotape deck.

10. In an automatic videotape cassette system, including a videotape deck, said deck having an elevator plate means onto which a cassette is placed, means to lower said elevator plate a selected distance and lock said elevator plate in said lowered position, and means to play the tape on said cassette, the improvement in automatic cassette unloader means comprising:
   a. means to support said deck at a selected tilt angle to the horizontal;
   b. vertically positionable shelf means in front of said elevator plate means of said videotape deck, the top surface of said shelf means substantially coplanar with the top surface of said elevator plate means, said tilt of said deck being upward away from said shelf; and
   c. means to raise said elevator plate means of said deck to its eject position, and means to eject said cassette along the surface of said elevator plate whereby said cassette on said elevator plate means will be unloaded from said elevator plate means, and will slide by gravity onto said shelf.

11. In an automatic videotape cassette system, including a videotape deck, the improvement in automatic cassette loading means comprising:
   a. said videotape deck including cassette elevator plate means;
   b. vertically positionable shelf means in front of said videotape deck the top surface of said shelf means substantially coplanar with the top surface of said elevator plate means, a cassette on said shelf;
   c. loading means including means to exert a force on said cassette at its edge away from said deck, said force having a first component parallel to the plane of said cassette, adapted to force said cassette in a forward direction along the surface of said shelf, onto and along the top surface of said elevator plate means, and a second component substantially perpendicular to the plane of said cassette, adapted to force said cassette and said elevator plate means downward 12. In an automatic videotape cassette system including a videotape deck having an elevator plate means and cassette eject means, the method of loading and unloading a tape cassette into and from said deck, comprising the steps of:
   a. supporting said videotape deck at a selected angle of slope to the horizontal;
   b. providing at least one vertically positionable shelf in front of said videotape deck, said shelf coplanar with the top surface of the elevator plate of said deck;
   c. placing a cassette to be loaded on said shelf;
   d. applying a first force to the back edge of said cassette in a direction to force it up said slope along said shelf onto said elevator plate, and against said eject means; and
   e. holding said first force while simultaneously applying a second force directed downwardly substantially perpendicular to the top surface of said cassette;
      whereby in response to said first force said cassette is pushed onto said elevator plate and against said eject means, said second force will press said cassette and said elevator plate down to its operating position,
   f. withdrawing said forces from said cassette; and
   g. mechanically lifting said elevator plate means to its unload position;
      whereby said eject plate will force said cassette to slide off said elevator plate and onto said shelf.

13. The method as in claim 12 in which said selected angle is in the range of 10° – 20°.

14. The method as in claim 12 in which said selected angle is 15°.

15. The method as in claim 12 including a plurality of shelves, in a frame which is vertically positionable, each shelf carrying a cassette; the additional steps of:
   a. positioning the frame so a first shelf is coplanar with said elevator plate;
   b. loading the first cassette from said first shelf into said deck, and playing the tape;
   c. unloading said first cassette from said deck onto said first shelf;
   d. repositioning said frame so a selected second shelf is coplanar with said elevator plate; and
   e. loading the second cassette from said second shelf into said deck.

* * * * *